F. JACKSON.
SPRING SEAT.
APPLICATION FILED APR. 15, 1913.
1,089,644.
Patented Mar. 10, 1914.
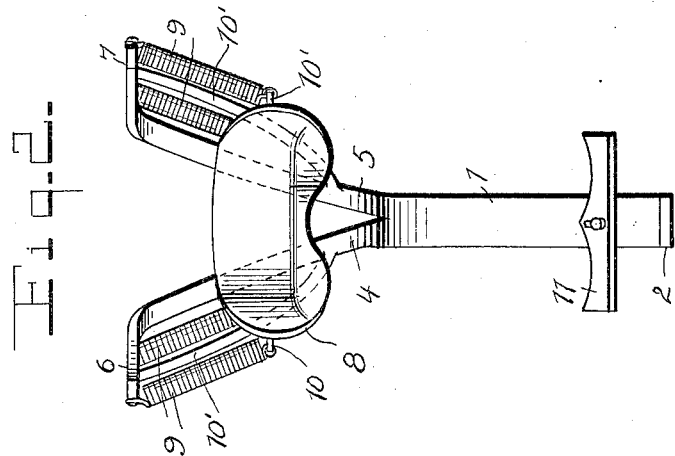
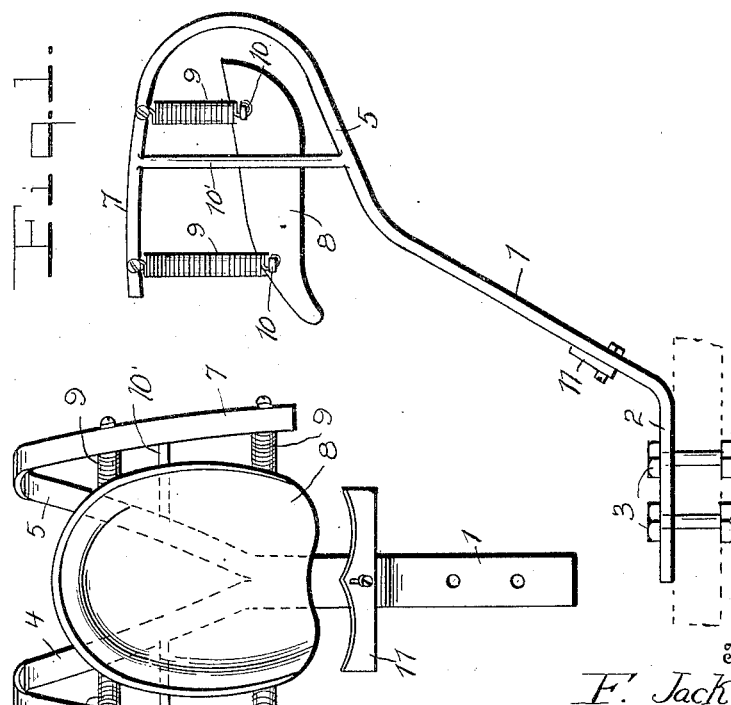
Witnesses
R. N. Jones
O. H. Sanborn
Inventor
F. Jackson,
By ..........
Attorney
COLUMBIA PLANOGRAPH CO., WASHINGTON, D. C.

UNITED STATES PATENT OFFICE.

FRANK JACKSON, OF RANDOLPH, NEBRASKA.

SPRING-SEAT.

1,089,644.  Specification of Letters Patent.  Patented Mar. 10, 1914.

Application filed April 15, 1913. Serial No. 761,296.

*To all whom it may concern:*

Be it known that I, FRANK JACKSON, a citizen of the United States, residing at Randolph, in the county of Cedar and State of Nebraska, have invented certain new and useful Improvements in Spring-Seats; and I do hereby declare the following to be a full, clear, and exact description of the invention, such as will enable others skilled in the art to which it appertains to make and use the same.

This invention relates to new and useful improvements in seats for harrows, harvesters, planters, and similar agricultural machines.

The principal object of this invention contemplates the provision of a spring seat for harrows, which will absorb all the sudden jolts and shocks occasioned by the driving of the machinery over rough ground.

A further object of this invention is to construct a seat with such regard to proportion, number, and arrangement of parts that it may be cheaply manufactured and will be durable and efficient in its operation.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a front elevation; Fig. 2 is a side elevation; and Fig. 3 is a top plan view.

Proceeding now to the description of the drawings, this invention includes a supporting standard 1 formed of tempered steel. The lower terminal of the standard is angularly bent, as at 2, and is secured to the harrow, planter, or any other machinery to which it may be applied, by bolts 3, or other suitable fastening devices. The upper terminal of the member 1 is bifurcated to produce the fork arms 4 and 5. These fork arms are bent upon themselves to produce substantially U-shaped chair arms, from the free ends 6 and 7 of which is suspended the seat 8 of this invention, which is preferably formed of steel or a like rigid metal.

In attaching the seat 8 to the free ends 6 and 7 of the fork arms, this invention employs the four spiral springs 9 secured at their upper terminals to the arms 6 and 7 and at their lower terminals to the perforated ears 10 secured by the seat 8. A pair of bracing rods 10' are disposed between the two arms of each of the forks to prevent undue downward movement of the free ends 6 and 7 when the driver is in the seat. A foot rest 11, consisting substantially of a slotted iron bar, is slidably mounted on the member 1 and is held in adjusted position thereon by a set screw 12.

From the foregoing it will be apparent that there has been provided a simple and inexpensive spring seat applicable to agricultural machinery of all types. In this connection it is desirable to emphasize the fact that, while this invention has been designed with particular reference to the needs of disk harrows which when passing over corn ground cause unusual discomfiture to the driver, it may nevertheless be readily employed in connection with agricultural machinery of any nature.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:

The herein described spring seat comprising a resilient standard having its upper end bifurcated to form chair arms and supports for the seats, said arms being bent outward to diverge from said standard and curved upward to extend forwardly, said standard and arm having integral, vertically disposed connecting braces, a seat suspended between and below said arms, and spiral springs each
5 connected at one end to said seat, and having their opposite ends connected to said arms.

In testimony whereof I affix my signature in presence of two witnesses.

FRANK JACKSON.

Witnesses:
G. B. SELLIN,
MARTIN A. JOHNSON.

---

Copies of this patent may be obtained for five cents each, by addressing the "Commissioner of Patents, Washington, D. C."

---